United States Patent

Oudenhoven

[15] 3,641,804
[45] Feb. 15, 1972

[54] TOOL FOR PLACING MARKS IN THE EARS OF ANIMALS

[72] Inventor: Theodorus Antonio Gerardus Oudenhoven, 499 Punta Chica, Partido San Fernando, Buenos Aires, Argentina

[22] Filed: Oct. 20, 1969

[21] Appl. No.: 867,706

[52] U.S. Cl. ................................ 72/409, 40/301, 128/330
[51] Int. Cl. ........................................................ B21d 9/08
[58] Field of Search .................. 128/316, 330; 40/300, 301, 40/2 F, 20 R, 21 R; 72/409, 410

[56] References Cited

UNITED STATES PATENTS

| 3,527,125 | 9/1970 | Filippo | 72/409 |
| 154,832 | 9/1874 | Brown | 72/410 |
| 1,575,069 | 3/1926 | Lenx | 72/409 |

FOREIGN PATENTS OR APPLICATIONS

| 895,915 | 5/1962 | Great Britain | 40/301 |
| 213,983 | 10/1909 | Germany | 128/330 |
| 641,367 | 4/1964 | Belgium | 40/300 |
| 832,372 | 6/1938 | France | 128/330 |

Primary Examiner—Charles W. Lanham
Assistant Examiner—Gene P. Crosby
Attorney—Christen & Sabol

[57] ABSTRACT

A tool for attaching a two-part identification tag to an animal, one part of the tag having a pointed projection to pierce an animal's ear, the other part having an aperture for the projection, comprising pincers having triangular-shaped plates at one end with cooperating resilient tongues to more or less firmly hold each of the two parts of the tag in position during attachment, one of the resilient tongues and plates being notched to permit the pointed projection to pass through the aperture in the tag held therein.

3 Claims, 6 Drawing Figures

PATENTED FEB 15 1972　　3,641,804

TOOL FOR PLACING MARKS IN THE EARS OF ANIMALS

The present invention refers to a tool for placing identification marks on animals, comprising a first element formed by a base and a stem-shaped projection perpendicular thereto, finishing in a pointed head and a plaquettelike element, designed to be inserted in said stem, the ear of the animal to be marked being arranged therebetween. The main object is to provide a structure for such a tool to permit the stem to be inserted on the ear of the animal while the plaquette is placed thereon.

By means of the tool of the present invention it is possible to perform the operation of marking an animal quickly, without danger and taking full advantage of the advantageous features of the marking elements referred to in the preceding paragraph.

Essentially, the scope of the invention is determined by the circumstances of its structure, consisting of a pair of articulated arms, said articulations being provided adjacent to one of the ends of said arms, each of which ends is widened so as to provide a surface confronting its similar counterpart, in which a tongue of resilient material is arranged, the free edge of said tongue being provided with a notch which, in one of the arms, registers with a slot formed in the above-mentioned widened portion.

Furthermore, the longer arm portions, as from the articulation, serve to support the straight ends of a spring helically wound on the articulation spindle of the said arms, in such a manner that the latter are permanently biased towards a maximum distance position of the widened ends thereof.

The invention likewise envisages other accessory objects which will be made clear during the course of the present specification.

In order that the present invention may be clearly understood and readily put into practice, same has been illustrated as an example and in one of its preferred embodiments, in the attached drawings, in which.

Like numerals represent like or similar parts throughout the several figures of the drawings.

In every respect in agreement with the drawings, the invention in its preferred embodiment consists of a pair of arms 1, 1a. These arms 1, 1a are articulated, towards one of their ends, by means of a spindle 2, provided with an abutment head 2a and prevented from slipping by a swaged or upset portion 2b.

Figure 2:
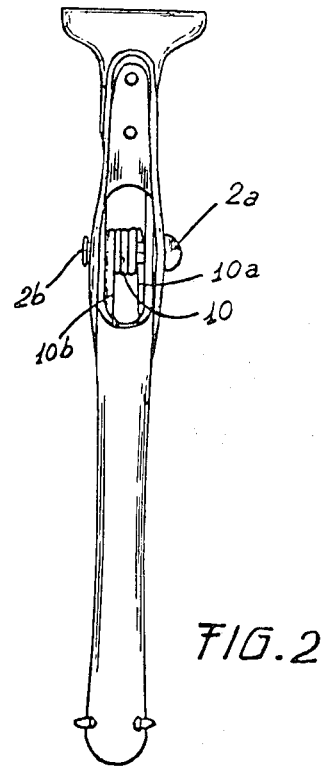
FIG. 2 is a profile view of the embodiment shown in the previous figure.

Preferably, arms 1, 1a are provided with a half-round or convex section, reaching up to the proximities of the reciprocal articulation, continuing in a flat section— in order to facilitate the necessary movements—up to the end thereof, beyond the articulation, where the profile of the arms is shaped as shown in FIG. 2. At said end, each arm is provided with a face 3, 3a, confronting its corresponding counterpart on the other arm. A generally flat triangular jaw 4, and corresponding jaw 4a, is affixed thereto by means of rivets 5, correspondingly 5a.

Figure 3:
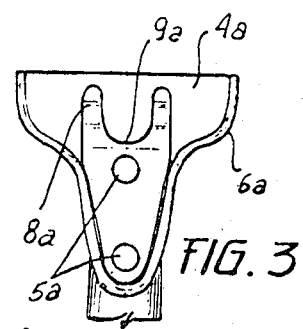
FIG. 3 is a detail view on a larger scale of one of the ends of a branch of the tool.
Figure 4:
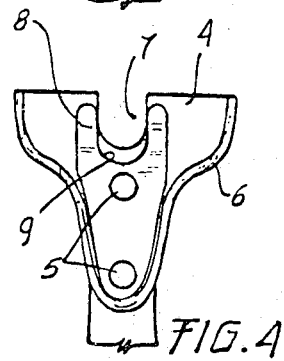
FIG. 4 is a view similar to that of FIG. 3, but corresponding to the other branch of the tool.

Said jaw includes a widened portion which is stiffened by a folded edge defining flanges 6, respectively 6a, as can be seen in FIGS. 3 and 4. Jaw 4, furthermore, is provided with a notch 7, the function of which will be explained later.

Taking advantage of aforementioned rivets 5,5a, resilient leaves 8, respectively 8a, are affixed to each one of the jaw 4, respectively 4a. The front edge of each of said leaves is provided with a notch 9, respectively 9a. The first notch 9 faces notch 7 provided in jaw 4.

Figure 1:
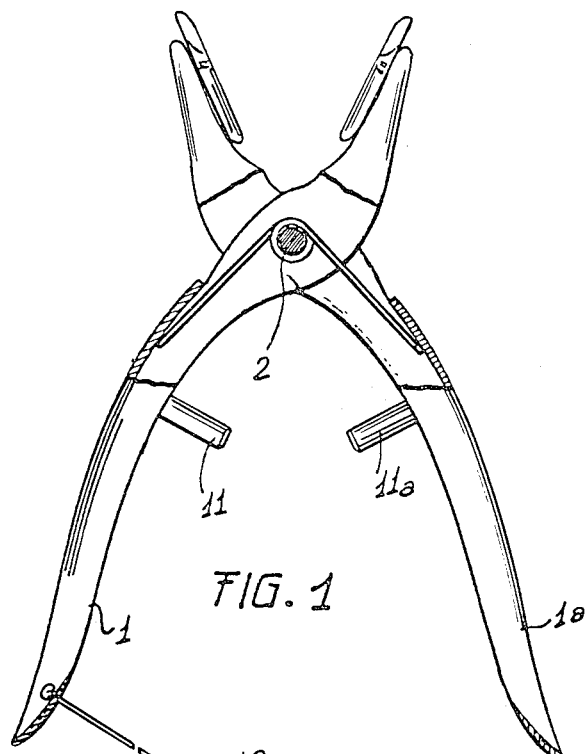
FIG. 1 is a front elevation view of the tool of the invention.
Figures 5, 6:
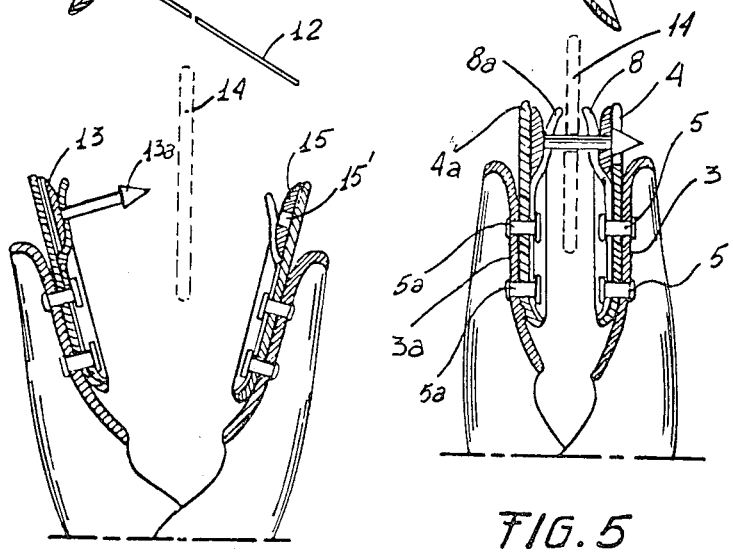
FIG. 5 is a view of the operative end of the tool, shown in one of its functional phases.
FIG. 6 is a view similar to that of FIG. 5 but illustrating another operative phase of the tool.

A helical spring wound on spindle 2, identified with reference 10, is supported by its free ends 10a and 10b in the concavity provided by each arm, in such a manner as to bias same permanently towards the open position shown in FIG. 1. The assembly is completed by abutment means 11, respectively 11a, which limit the closing stroke of the arms to a position such as shown in FIG. 5, in which the operative ends of the tool are parallel. A tie 12 permits the tool to be kept closed, as shown in the above-mentioned figure.

The operation of the tool is as follows:

Inasmuch as the front edges of resilient leaves or tongues 8, 8a are curved outwardly from the position in which they engage jaws 4, respectively 4a, see FIG. 6, element 13, which is to form part of the mark, can be inserted between 4a and 8a, the projection 13a thereof being passed through 9a. The ear 14 of the animal is placed between the space left by the operative ends of the tool, and the other component 15, in the shape of a perforated plaquette, is placed between 4 and 8. Pressure is then exerted on the long portions or branches of arms 1 and 1a, until the extremity of head 13a, of element 13, perforates the ear and forcibly passes through the perforation provided in plaquette 15' and slots 9 and 7, as illustrated in FIG. 5. The marking operation is thus brought to an end. It is then merely necessary to loosen the arms in order that, due to spring action of spring 10, the ends tend to open, releasing the resilient leaves or tongues, both components of the mark already forming an integral whole. This brings the operation to a close.

It is to be understood that the shape of the arms as likewise the provision of jaw 4, respectively 4a, have been given as examples only, their shape being subject to variation by making the extension of the operative end of each arm of the same material as the latter or otherwise, without thereby implying any departure from the fundamental principle of the invention.

The invention as explained can be clearly understood and further explanations will not be required by those versed in the art.

It is evident that sundry changes as to construction and detail may be made without departing from the nature of the present invention, as clearly defined in the following claims.

Having thus particularly described and determined the nature of the present invention and the manner in which same is to be put into practice, it is declared that what is claimed as exclusive property and invention is:

1. A tool for applying a two-part identification tag means to an animal, one of said two parts comprising a generally flat plate provided with an upstanding central pointed projection, the other of said two parts comprising a generally flat plate having an aperture to receive said pointed projection after piercing a portion of an animal comprising pincers having a pair of articulated arms terminating at their respective one ends in a pair of coacting identification tag supporting means, each of said tag-supporting means including a generally triangular flat plate and a resilient tongue attached at one end to the flat plate, the other end of each tongue being notched to permit passage of said pointed projection and being spaced from the respective flat plate to receive one of said two parts of the identification tag means, one of said triangular flat plates also being notched to correspond with the notch in the resilient tongue attached thereto.

2. The invention defined in claim 1, wherein two of the sides of said triangular flat plates are provided with flanged margins.

3. The invention defined in claim 2, wherein the free ends of said resilient tongues are curved to assist in retaining a respective one of the two plates of the identification tag means in place.

* * * * *